US008094599B2

(12) United States Patent
Marinier et al.

(10) Patent No.: US 8,094,599 B2
(45) Date of Patent: Jan. 10, 2012

(54) METHOD AND APPARATUS FOR TRANSMITTING AND RECEIVING COMMON LOGICAL CHANNEL AND DEDICATED LOGICAL CHANNEL TRANSMISSIONS VIA A HIGH SPEED DOWNLINK SHARED CHANNEL

(75) Inventors: Paul Marinier, Brossard (CA); Christopher R. Cave, Verdun (CA); Stephen E. Terry, Northport, NY (US); Diana Pani, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 775 days.

(21) Appl. No.: 11/970,272

(22) Filed: Jan. 7, 2008

(65) Prior Publication Data

US 2008/0165755 A1 Jul. 10, 2008

Related U.S. Application Data

(60) Provisional application No. 60/883,521, filed on Jan. 5, 2007.

(51) Int. Cl.
*H04H 20/71* (2008.01)
*H04W 4/00* (2009.01)
*H04J 3/26* (2006.01)

(52) U.S. Cl. ......... 370/312; 370/329; 370/338; 370/432

(58) Field of Classification Search ....... 370/229–238.1, 370/310–350, 431–462, 464–485; 375/260; 455/59–72
See application file for complete search history.

(56) References Cited

U.S. PATENT DOCUMENTS 7,406,314 B2 * 7/2008 Sharma ........................ 455/445
7,406,315 B2   7/2008 Sharma
7,764,645 B2 * 7/2010 Yi et al. ....................... 370/328
(Continued)

FOREIGN PATENT DOCUMENTS

WO    2004/028041    4/2004
(Continued)

OTHER PUBLICATIONS $3^{rd}$ Generation Partnership Project; Technical Specification Group Radio Access Network; Medium Access Control (MAC) Protocol Specification (Release 6); 3GPP TS 25.321 V6.9.0 (Jun. 2006).

(Continued)

*Primary Examiner* — Tri H Phan
(74) *Attorney, Agent, or Firm* — Volpe and Koenig, P.C.

(57) ABSTRACT

A method and apparatus for transmitting and receiving common logical channel and dedicated logical channel transmissions via a high speed downlink shared channel (HS-DSCH) are disclosed. A medium access control (MAC)-hs entity generates a MAC-hs protocol data unit (PDU) carrying a MAC-c/sh/m PDU and/or a MAC-d PDU. A UE-specific HS-DSCH radio network temporary identifier (H-RNTI) may be used for the MAC-d PDU, and a cell-specific H-RNTI may be used for the MAC-c/sh/b PDU. Alternatively, a cell-specific H-RNTI and one of a cell RNTI (C-RNTI) and a universal terrestrial radio access network RNTI (U-RNTI) may be used in a Cell_FACH state. The logical channel type and identity may be inserted in a MAC-hs PDU header or indicated by a distinct H-RNTI. A logical channel type for common logical channels may be identified in a MAC-c/sh/m PDU header. The logical channel type and identity may be identified by a queue identity.

14 Claims, 10 Drawing Sheets

U.S. PATENT DOCUMENTS

| | | | | |
|---|---|---|---|---|
| 7,864,722 | B2* | 1/2011 | Yi et al. | 370/312 |
| 7,894,390 | B2* | 2/2011 | Nakamata et al. | 370/329 |
| 7,907,558 | B2* | 3/2011 | Shahid et al. | 370/312 |
| 7,911,965 | B2* | 3/2011 | Bergstrom et al. | 370/252 |
| 2004/0156330 | A1 | 8/2004 | Yi et al. | |
| 2006/0209870 | A1* | 9/2006 | Lee et al. | 370/432 |
| 2008/0089285 | A1* | 4/2008 | Pirskanen et al. | 370/329 |
| 2008/0159218 | A1* | 7/2008 | Dwarakanath | 370/329 |
| 2008/0159323 | A1* | 7/2008 | Rinne et al. | 370/431 |
| 2008/0182594 | A1* | 7/2008 | Flore et al. | 455/458 |
| 2009/0225693 | A1* | 9/2009 | Yi et al. | 370/312 |
| 2010/0074192 | A1* | 3/2010 | Beming et al. | 370/329 |

FOREIGN PATENT DOCUMENTS

| | | |
|---|---|---|
| WO | 2006/088301 | 8/2006 |
| WO | 2006/113829 | 10/2006 |
| WO | 2006/125472 | 11/2006 |
| WO | 2008/033072 | 3/2008 |

OTHER PUBLICATIONS

3rd Generation Partnership Project; Technical Specification Group Radio Access Network; Medium Access Control (MAC) Protocol Specification (Release 6); 3GPP TS 25.321 v6.11.0 (Dec. 2006).

3rd Generation Partnership Project; Technical Specification Group Radio Access Network; Medium Access Control (MAC) Protocol Specification (Release 6); 3GPP TS 25.321 V6.14.0 (Jul. 2007).

3rd Generation Partnership Project; Technical Specification Group Radio Access Network; Medium Access Control (MAC) Protocol Specification (Release 7); 3GPP TS 25.321 V7.3.0 (Dec. 2006).

3rd Generation Partnership Project; Technical Specification Group Radio Access Network; Medium Access Control (MAC) Protocol Specification (Release 7); 3GPP TS 25.321 V7.7.0 (Dec. 2007).

3rd Generation Partnership Project; Technical Specification Group Radio Access Network; Medium Access Control (MAC) Protocol Specification (Release 8); 3GPP TS 25.321 V8.0.0 (Dec. 2007).

Nokia "Further Discussion on Delay Enhancements in Rel7", 3GPP TSG-RAN WG1 Meeting #46; Tallinn, Estonia; Aug. 28-Sep. 1, 2006; R2-062244.

Ericsson "Enhanced Cell_Fach", 3GPP TSG RAN WG2 #56; Riga, Latvia; Nov. 6-10, 2006; R2-063209.

Ericsson, Nokia "Enhanced Paging Procedure", 3GPP TSG RAN WG2 #56; Riga, Latvia; Nov. 6-10, 2006; R2-063210.

3rd Generation Partnership Project; Technical Specification Group Radio Access Network; Medium Access Control (MAC) Protocol Specification (Release 6); 3GPP TS 25.321 V6.9.0 (Jun. 2006).

3rd Generation Partnership Project; Technical Specification Group Radio Access Network; Medium Access Control (MAC) Protocol Specification (Release 6); 3GPP TS 25.321 v6.9.0 (Dec. 2006).

3rd Generation Partnership Project; Technical Specification Group Radio Access Network; Medium Access Control (MAC) Protocol Specification (Release 6); 3GPP TS 25.321 V6.9.0 (Sep. 2007).

3rd Generation Partnership Project; Technical Specification Group Radio Access Network; Medium Access Control (MAC) Protocol Specification (Release 7); 3GPP TS 25.321 V7.3.0 (Dec. 2006).

3rd Generation Partnership Project; Technical Specification Group Radio Access Network; Medium Access Control (MAC) Protocol Specification (Release 7); 3GPP TS 25.321 V7.7.0 (Dec. 2007).

3rd Generation Partnership Project; Technical Specification Group Radio Access Network; Medium Access Control (MAC) Protocol Specification (Release 8); 3GPP TS 25.321 V8.0.0 (Dec. 2007).

3rd Generation Partnership Project; Technical Specification Group Radio Access Network; Radio Resource Control (RRC); Protocol Specification (Release 4); 3GPP TS 25.331 V4.17.0 (Mar. 2005).

3rd Generation Partnership Project; Technical Specification Group Radio Access Network; Radio Resource Control (RRC); Protocol Specification (Release 4); 3GPP TS 25.331 V4.18.0 (Dec. 2007).

3rd Generation Partnership Project; Technical Specification Group Radio Access Network; Radio Resource Control (RRC); Protocol Specification (Release 5); 3GPP TS 25.331 V5.19.0 (Dec. 2006).

3rd Generation Partnership Project; Technical Specification Group Radio Access Network; Radio Resource Control (RRC); Protocol Specification (Release 5); 3GPP TS 25.331 V5.21.0 (Dec. 2007).

3rd Generation Partnership Project; Technical Specification Group Radio Access Network; High Speed Downlink Packet Access (HSDPA); Overall description; Stage 2 (Release 7); 3GPP TS 25.308 V7.1.0 (Dec. 2006).

3rd Generation Partnership Project; Technical Specification Group Radio Access Network; High Speed Downlink Packet Access (HSDPA); Overall description; Stage 2 (Release 6); 3GPP TS 25.308 V6.3.0 (Dec. 2004).

3rd Generation Partnership Project; Technical Specification Group Radio Access Network; High Speed Downlink Packet Access (HSDPA); Overall description; Stage 2 (Release 5); 3GPP TS 25.308 V5.7.0 (Dec. 2004).

3rd Generation Partnership Project; Technical Specification Group Radio Access Network; Multiplexing and channel coding (FDD) (Release 7); 3GPP TS 25.212 V7.3.0 (Dec. 2006).

3rd Generation Partnership Project; Technical Specification Group Radio Access Network; Multiplexing and channel coding (FDD) (Release 6); 3GPP TS 25.212 V6.10.0 (Dec. 2006).

3rd Generation Partnership Project; Technical Specification Group Radio Access Network; Multiplexing and channel coding (FDD) (Release 5); 3GPP TS 25.212 V5.10.0 (Jun. 2005).

3rd Generation Partnership Project; Technical Specification Group Radio Access Network; Multiplexing and channel coding (FDD) (Release 8); 3GPP TS 25.212 V8.0.0 (Nov. 2007).

3rd Generation Partnership Project; Technical Specification Group Radio Access Network; Multiplexing and channel coding (FDD) (Release 8); 3GPP TS 25.212 V7.7.0 (Nov. 2007).

3rd Generation Partnership Project; Technical Specification Group Radio Access Network; Radio Interface Protocol Architecture (Release 8); 3GPP TS 25.301 V8.0.0 (Dec. 2007).

3rd Generation Partnership Project; Technical Specification Group Radio Access Network; Radio Interface Protocol Architecture (Release 6); 3GPP TS 25.301 V6.4.0 (Sep. 2005).

3rd Generation Partnership Project; Technical Specification Group Radio Access Network; Radio interface Protocol Architecture (Release 5); 3GPP TS 25.301 V5.6.0 (Sep. 2005).

3rd Generation Partnership Project; Technical Specification Group Radio Access Network; Radio Interface Protocol Architecture (Release 6); 3GPP TS 25.301 V6.5.0 (Sep. 2007).

3rd Generation Partnership Project; Technical Specification Group Radio Access Network; Radio Interface Protocol Architecture (Release 7); 3GPP TS 25.301 V7.0.0 (Mar. 2006).

3rd Generation Partnership Project; Technical Specification Group Radio Access Network; Radio Interface Protocol Architecture (Release 7); 3GPP TS 25.301 V7.3.0 (Sep. 2007).

3rd Generation Partnership Project; Technical Specification Group Radio Access Network; High Speed Downlink Packet Access (HSDPA); Overall description; Stage 2 (Release 8); 3GPP TS 25.308 V8.0.0 (Dec. 2007).

3rd Generation Partnership Project; Technical Specification Group Radio Access Network; High Speed Downlink Packet Access (HSDPA); Overall description; Stage 2 (Release 7); 3GPP TS 25.308 V7.5.0 (Dec. 2007).

3rd Generation Partnership Project; Technical Specification Group Radio Access Network; High Speed Downlink Packet Access (HSDPA); Overall description; Stage 2 (Release 6); 3GPP TS 25.308 V6.4.0 (Mar. 2007).

3rd Generation Partnership Project; Technical Specification Group Radio Access Network; Radio Resource Control (RRC); Protocol Specification (Release 7); 3GPP TS 25.331 V7.3.0 (Dec. 2006).

3rd Generation Partnership Project; Technical Specification Group Radio Access Network; Radio Resource Control (RRC); Protocol Specification (Release 8); 3GPP TS 25.331 V8.0.0 (Sep. 2007).

3rd Generation Partnership Project; Technical Specification Group Radio Access Network; Radio Resource Control (RRC); Protocol Specification (Release 7); 3GPP TS 25.331 V7.7.0 (Dec. 2007).

3rd Generation Partnership Project; Technical Specification Group Radio Access Network; Radio Resource Control (RRC); Protocol Specification (Release 6); 3GPP TS 25.331 V6.16.0 (Dec. 2007).

3rd Generation Partnership Project; Technical Specification Group Radio Access Network; Radio Resource Control (RRC); Protocol Specification (Release 6); 3GPP TS 25.331 V6.12.0 (Dec. 2006).

Ericsson "Enhanced CELL_FACH", 3GPP TSG RAN WG2 #56; Riga, Latvia; 6th—10th Nov. 2006; R2-063209.

Ericsson, Nokia "Enhanced Paging Procedure", 3GPP TSG RAN WG2 #56; Riga, Latvia; 6th—10th Nov. 2006; R2-063210.

Nokia "Further Discussion on Delay Enhancements in Rel7", 3GPP TSG-RAN WG1 Meeting #46; Tallinn, Estonia; Aug. 28th—Sep. 1st, 2006; R2-062244.

* cited by examiner

METHOD AND APPARATUS FOR TRANSMITTING AND RECEIVING COMMON LOGICAL CHANNEL AND DEDICATED LOGICAL CHANNEL TRANSMISSIONS VIA A HIGH SPEED DOWNLINK SHARED CHANNEL

CROSS REFERENCE TO RELATED APPLICATION

This application claims the benefit of U.S. provisional application No. 60/883,521 filed Jan. 5, 2007, which is incorporated by reference as if fully set forth.

FIELD OF INVENTION

The present invention is related to wireless communication.

BACKGROUND

High-speed shared channels for downlink and uplink transmissions are available in third generation partnership project (3GPP) Release 6 systems. Currently, these channels are only available when a user equipment (UE) is in a Cell_DCH state. The UE is in the Cell_DCH state if dedicated channels are allocated for the UE. In other radio resource control (RRC) states of the connected mode, (i.e., Cell_FACH, Cell_PCH, and URA_PCH states), the UE is not allocated dedicated channels. Communication with the UE takes place over a random access channel (RACH) and a forward access channel (FACH) in the Cell_FACH state, and over a paging channel (PCH) in the Cell_PCH and URA_PCH states.

FIGS. 1 and 2 show conventional medium access control (MAC) entities in the network and in the UE, respectively. A plurality of sub-MAC entities are included in the MAC entity. The MAC-b entity controls a broadcast channel (BCH). The MAC-c/sh/m controls access to all common transport channels, except a high speed downlink shared channel (HS-DSCH). The MAC-d controls access to all dedicated transport channels to MAC-c/sh/m and MAC-hs. The MAC-hs handles high speed downlink packet access (HSDPA) specific functions and controls access to the HS-DSCH. The MAC-e/es controls access to an enhanced dedicated channel (E-DCH).

The data rates available on the FACH channel in the downlink are in practice limited to low values due to the inability of a radio network controller (RNC) to modify its transmission power or a modulation and coding scheme to adapt to the requirements of the different UEs served by the FACH. This data rate limitation means that the duration needed to set up dedicated channels for the UE is relatively long and this, in turn, results in long call setup times which degrade end-user experience. Because of this, it has been proposed to allow the use of the HS-DSCH while the UE is in the Cell_FACH state. It has also been proposed to allow the use of the HS-DSCH for paging in the Cell_PCH and URA_PCH states.

While allowing the utilization of the HS-DSCH in the Cell_FACH, Cell_PCH, and URA_PCH states would improve the system performance, there are a number of issues that need to be solved in order to avoid inefficiencies. MAC architecture should be modified to allow the utilization of the HS-DSCH in other RRC states. MAC sub-entities should also be modified to solve the following issues: how to efficiently identify UEs that the data carried over the HS-DSCH belong to; how to efficiently identify types of logical channels that the data carried over the HS-DSCH belong to; and how to handle legacy UEs that do not support the feature.

SUMMARY

A method and apparatus for transmitting and receiving common logical channel and dedicated logical channel transmissions via an HS-DSCH are disclosed. A MAC-hs entity in a network generates a MAC-hs protocol data unit (PDU) carrying the MAC-c/sh/m PDU and/or the MAC-d PDU and transmitting the MAC-hs PDU via an HS-DSCH. A UE-specific HS-DSCH radio network temporary identifier (H-RNTI) may be used for the MAC-d PDU, and a cell-specific H-RNTI may be used for the MAC-c/sh/b PDU. Alternatively, the MAC-hs entity may use a cell-specific H-RNTI and one of a cell RNTI (C-RNTI) and a universal terrestrial radio access network RNTI (U-RNTI) when the UE is in a Cell_FACH state. The logical channel type and identity may be inserted in a MAC-hs PDU header. A distinct H-RNTI may be used to identify a logical channel type and identity. A logical channel type for the common logical channel may be identified in a MAC-c/sh/m PDU header. The logical channel type and identity may be identified by a queue identity (ID).

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "UE" includes but is not limited to a wireless transmit/receive unit (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Conventional MAC entities in the network and in the UE are modified to enable mapping of common and shared logical channels, (hereinafter collectively "common logical channels"), and dedicated logical channels onto the HS-DSCH and identify a UE and/or a logical channel for the HS-DSCH transmission. The common logical channels include, but are not limited to, a paging control channel (PCCH), a common control channel (CCCH), a broadcast control channel (BCCH), a shared channel control channel (SHCCH), a common traffic channel (CTCH), a multimedia broadcast multicast services (MBMS) traffic channel (MTCH), an MBMS scheduling channel (MSCH), an MBMS control channel (MCCH), and the like. The dedicated logical channels include, but are not limited to, a dedicated control channel (DCCH) and a dedicated traffic channel (DTCH). New functions are added or conventional functions are modified in the sub-MAC entities in the network and the UE as shown in FIGS. 3-9.

Figure 1:
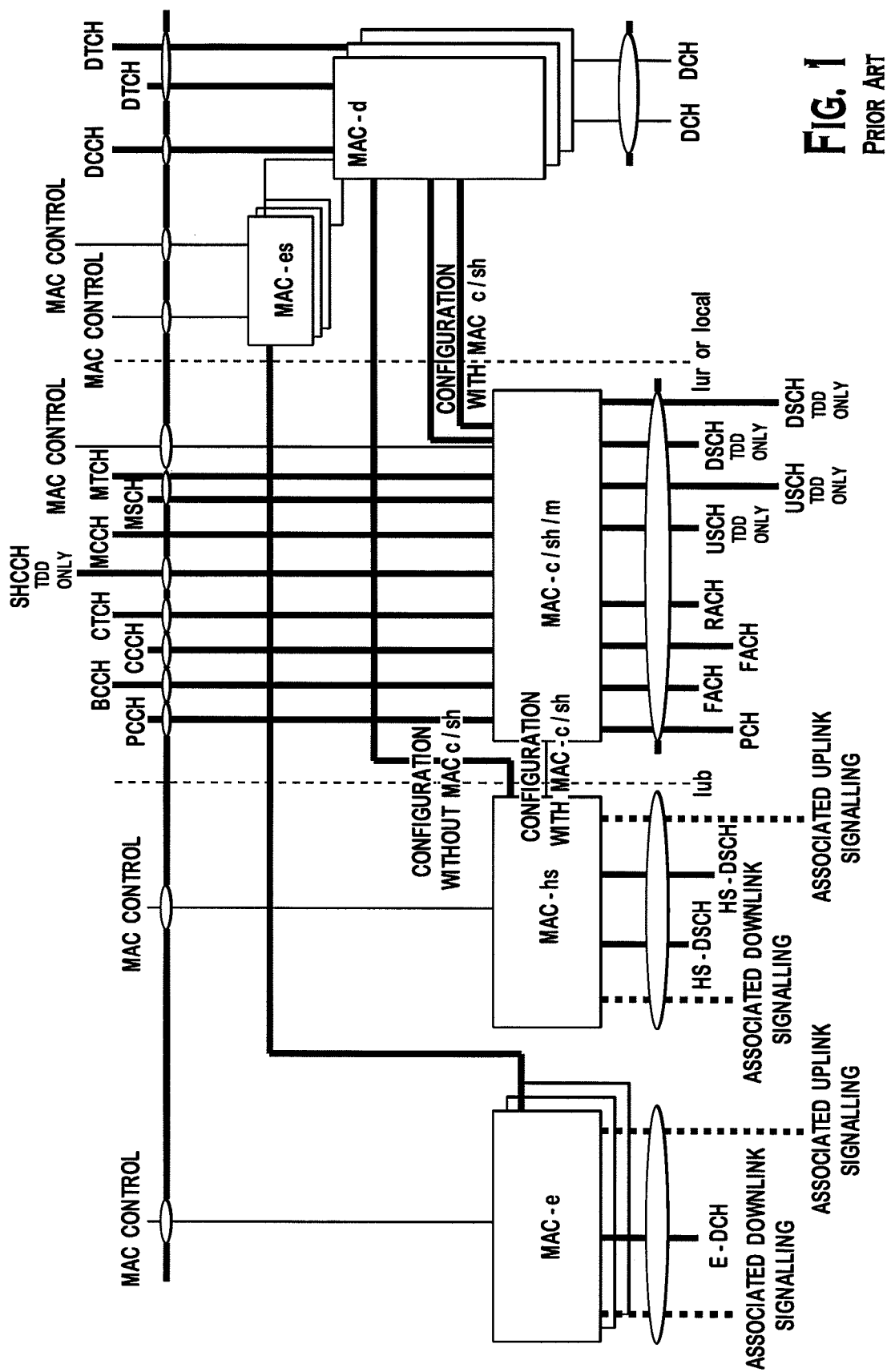
FIG. 1 shows a conventional MAC entity in the network.
Figure 2:
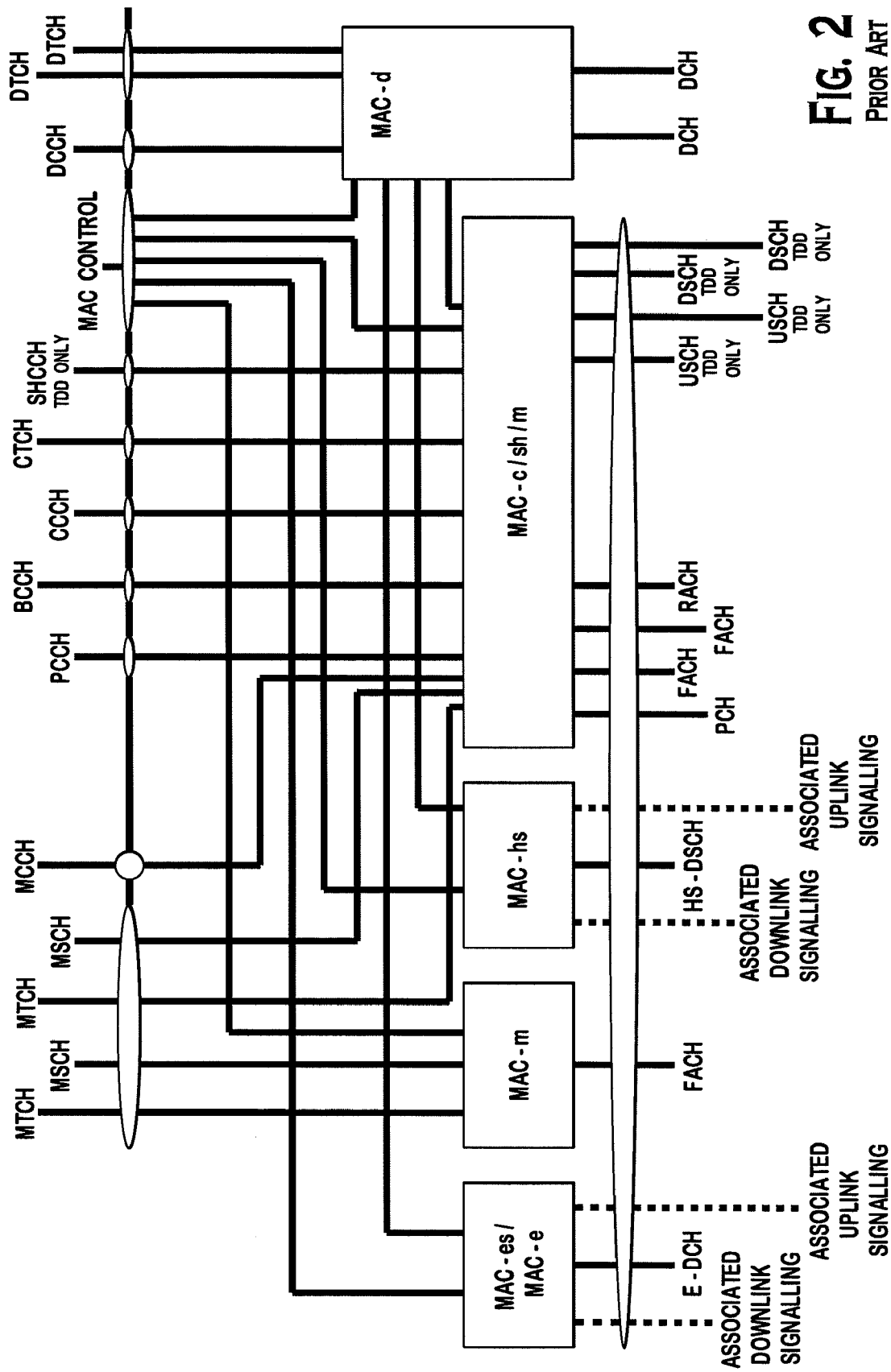
FIG. 2 shows a conventional MAC entity in the UE.
Figure 3:
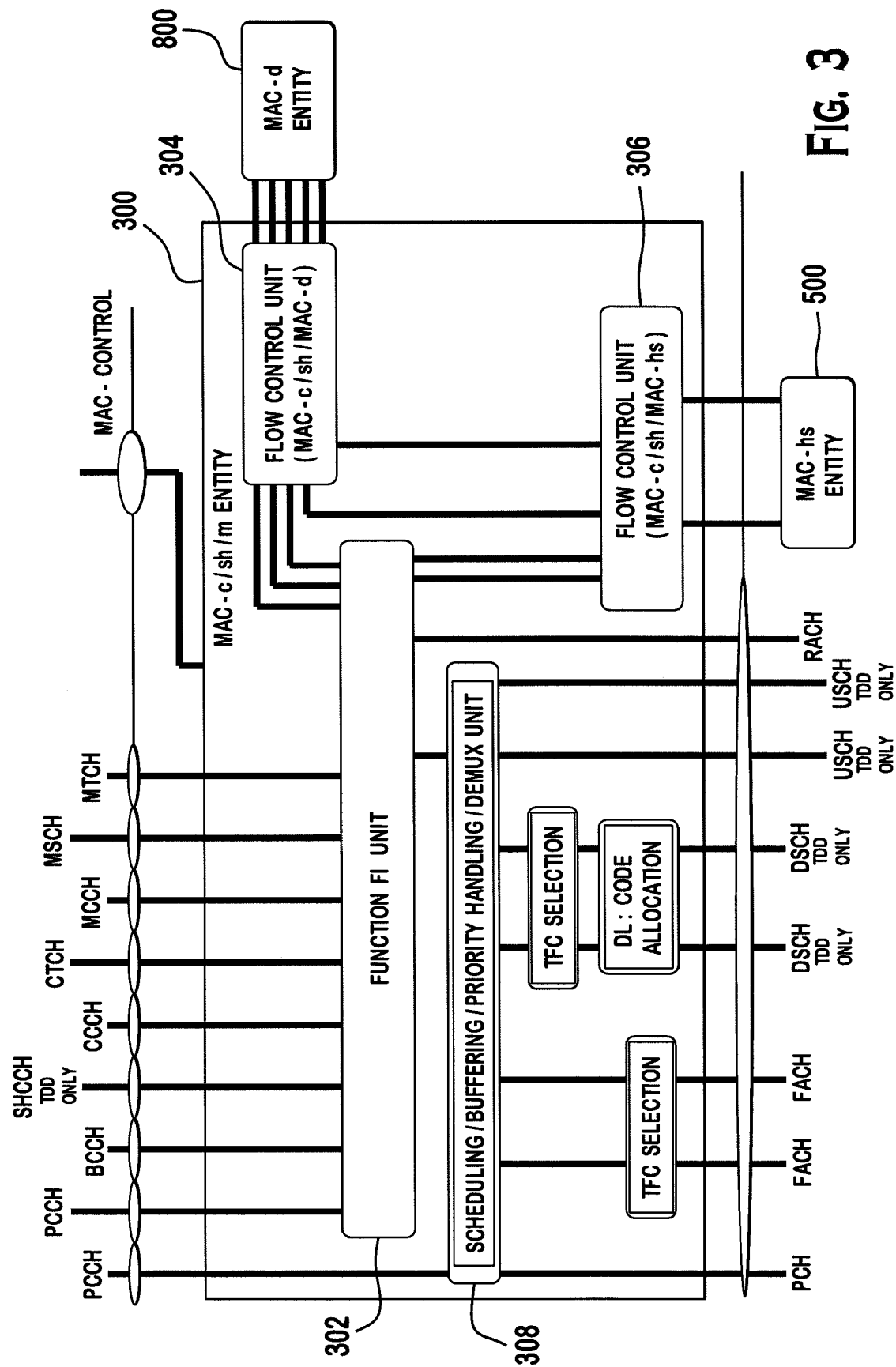
FIG. 3 shows a MAC-c/sh/m entity in the network.

FIG. 3 shows a MAC-c/sh/m entity 300 in the network. The MAC-c/sh/m entity 300 receives MAC service data unit (SDU) via the common logical channels, (e.g., PCCH, BCCH, SHCCH, CCCH, CTCH, MCCH, MSCH, MTCH, etc.), and receives MAC-d PDUs from a MAC-d entity. The MAC-c/sh/m entity 300 may output a MAC-c/sh/m PDU to the MAC-hs entity for transmission over the HS-DSCH. Alternatively, the MAC-c/sh/m entity 300 may transmit the MAC SDUs from the common logical channels via common transport channels, (such as a RACH, an FACH, etc.), as in prior art.

The MAC-c/sh/m entity 300 includes an F1 function unit 302. The F1 function unit 302 receives MAC SDUs via the common logical channels and MAC-d PDUs from the MAC-d entity 800 via a flow control unit 304. The F1 function unit 302 dynamically determines whether the logical channel should be mapped to the HS-DSCH or another transport channel as in prior art. Such determination may be based on the knowledge of the capabilities of the UE(s) to which the information is intended if known because legacy UEs may not have the capability of utilizing HS-DSCH in an RRC state other than the Cell_DCH state. The F1 function unit 302 may insert logical channel identity, (e.g., target channel type field (TCTF)), in the MAC-c/sh/m PDU, which will be explained in detail below.

The MAC SDUs and MAC-d PDUs processed by the F1 function unit 302 may be sent to the MAC-hs entity 500 via a flow control unit 306 for transmission over the HS-DSCH. Alternatively, the MAC SDUs and the MAC-d PDUs processed by the F1 function unit may be first processed by the scheduling/buffering/priority handling/demultiplexing unit 308 and then forwarded to the MAC-hs entity 500 via the flow control unit 306.

The MAC-c/sh/m entity 300 must provide appropriate timing information to the MAC-hs entity 500 to ensure that the BCCH and PCCH information is transmitted at the appropriate time.

Figure 4:
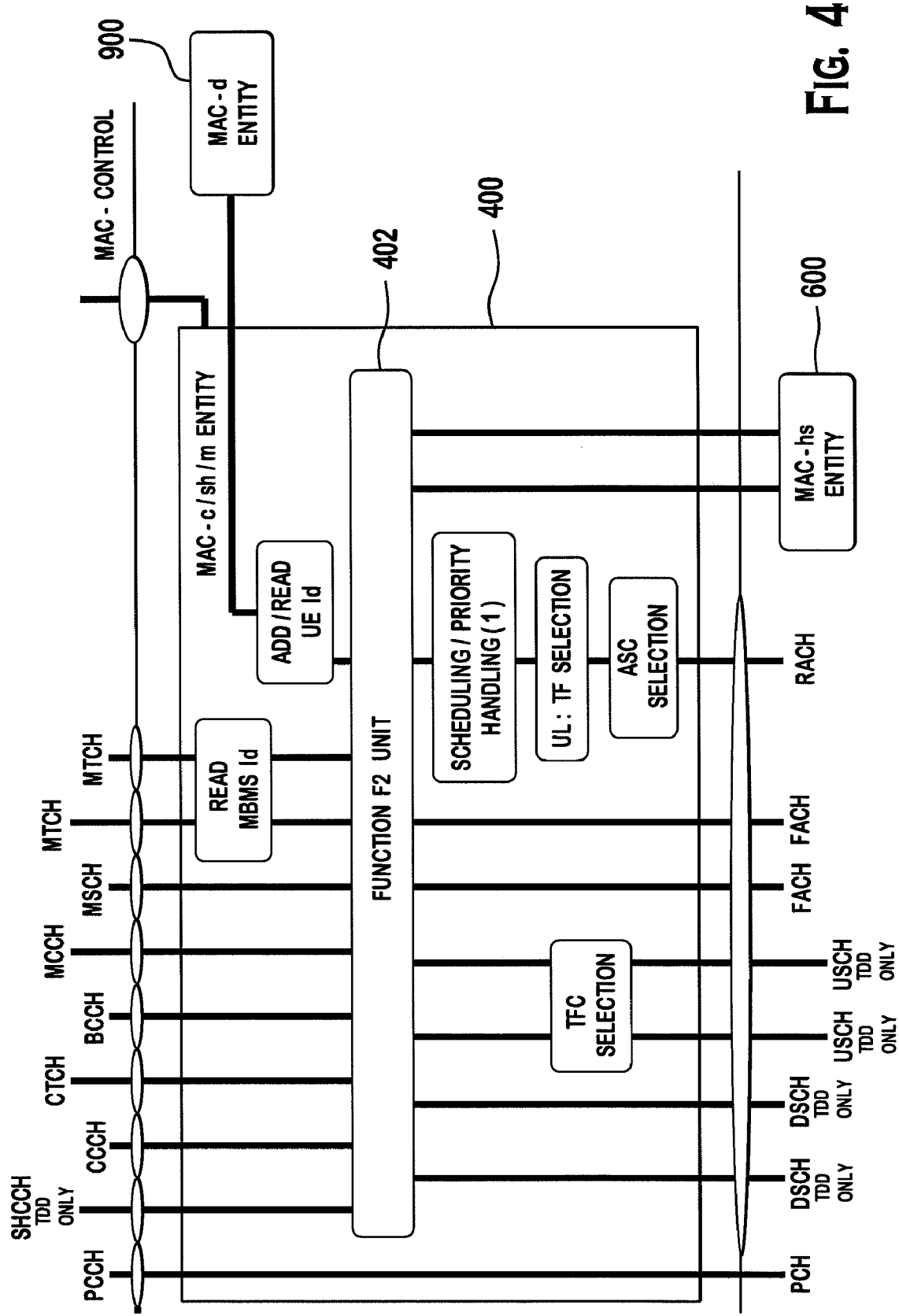
FIG. 4 shows a MAC-c/sh/m entity in a wireless transmit/receive unit (WTRU)

FIG. 4 shows a corresponding MAC-c/sh/m entity 400 in the UE. The MAC-c/sh/m entity 400 includes an F2 function unit 402. The F2 function unit 402 receives a MAC-hs SDU from the MAC-hs entity 600. The F2 function unit 402 detects logical channel identity, (e.g., TCTF), in the header, and maps between logical channels and transport channels.

Figure 5:
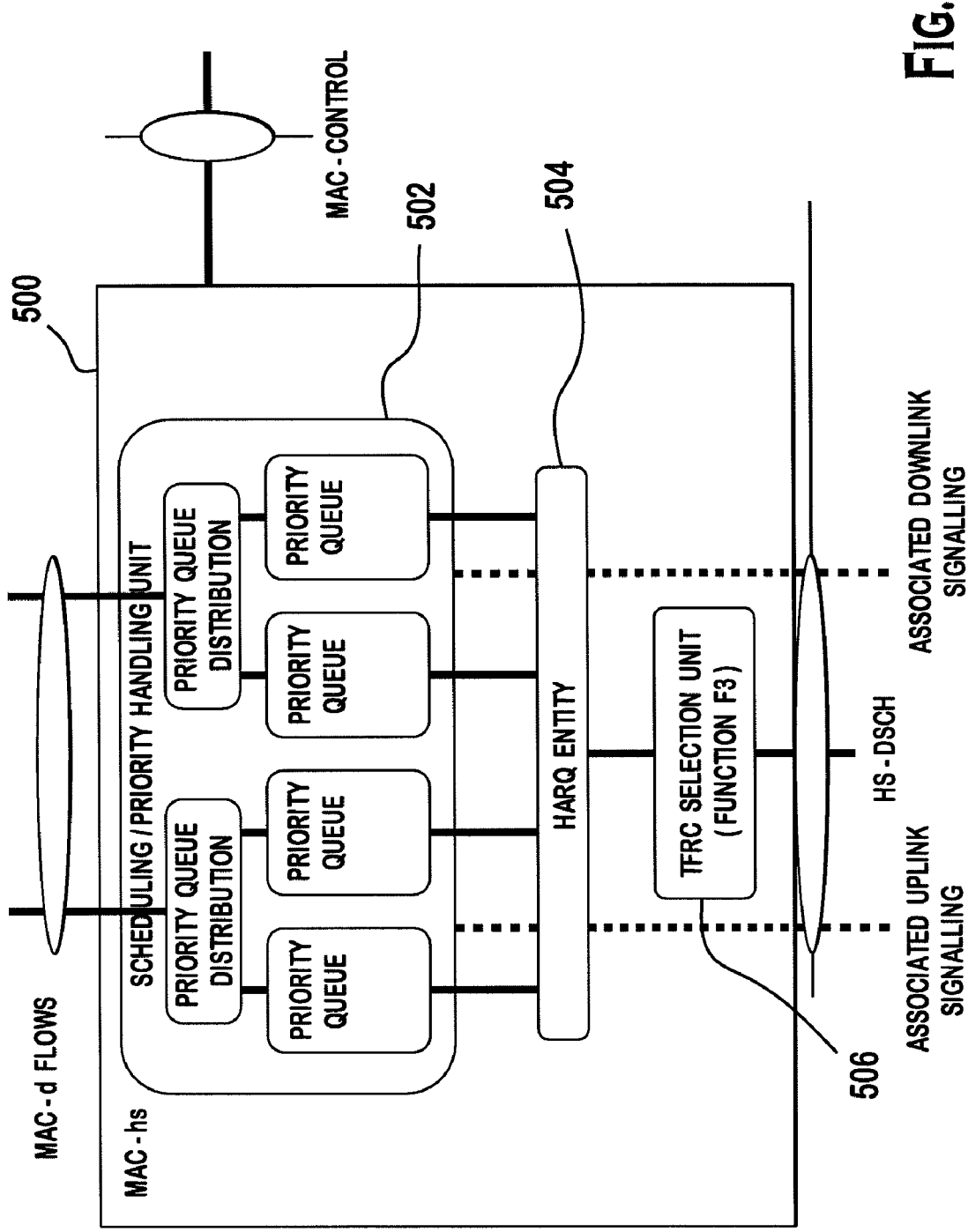
FIG. 5 shows a MAC-hs entity in the network.

FIG. 5 shows a MAC-hs entity 500 in the network. The MAC-hs entity 500 receives MAC-c/sh/m PDU and MAC-d PDU and outputs a MAC-hs PDU for transmission over the HS-DSCH. The MAC-hs entity 500 includes a scheduling and priority handling unit 502, an HARQ entity 504, and a transport format and resource combination (TFRC) selection unit 506. The scheduling and priority handling unit 502 manages HS-DSCH resources between the HARQ entity 504 and data flows according to their priority. The scheduling and priority handling unit 502 also determines the queue ID and TSN for each new MAC-hs PDU being serviced. The HARQ entity 504 handles the HARQ functionality for the UE. The TFRC selection unit 5-6 selects an appropriate transport format and resource for the data to be transmitted on HS-DSCH. In addition, the TFRC selection unit 506 performs function F3 to insert logical channel type and identity, (e.g., TCTF and C/T Mux), in the MAC-hs header and/or select an HS-DSCH radio network temporary identity (H-RNTI), and insert "UE-ID" and/or "UE-ID Type" fields in the MAC-hs header, which will be explained in detail below.

Figure 6:
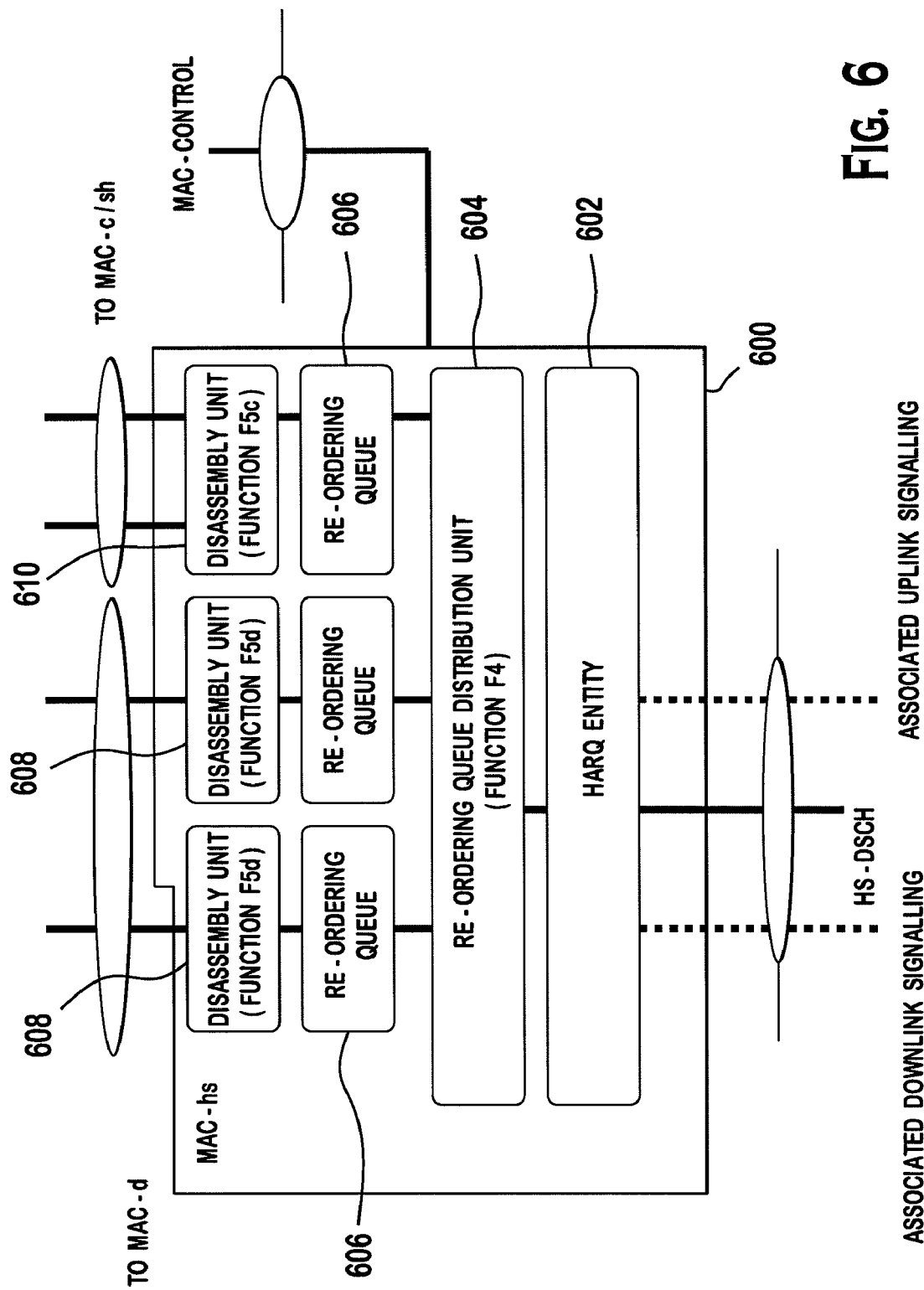
FIG. 6 shows a MAC-hs entity in the WTRU in accordance with one embodiment.

FIG. 6 shows a corresponding MAC-hs entity 600 in the UE. The MAC-hs entity 600 includes an HARQ entity 602, a reordering queue distribution unit 604, a plurality of reordering queues 606, and a plurality of disassembly units 608, 610. The HARQ entity 602 performs HARQ functionality. The reordering queue distribution unit 604 distributes the received MAC-hs PDUs to the correct reordering queue 606 based on the queue ID. The reordering queue distribution unit 604 also performs function F4 to distribute the received MAC-hs PDUs to the correct reordering buffer. The distribution may be based on the logical channel ID or the detected H-RNTI or both, depending on the method that is used to signal logical channel. When different queues or logical channels are multiplexed in one MAC-hs PDU, the reordering queue distribution unit 604, (more specifically Function 4 in unit 604), may perform de-multiplexing or de-assembly of the MAC-hs PDU into the respective logical channels or queues. The de-assembly/de-multiplexing shall be done prior to reordering.

The disassembly entities 608, 610 are responsible for the disassembly of MAC-hs PDUs. When a MAC-hs PDU is disassembled the MAC-hs header is removed, the MAC-d PDUs or MAC-c/sh/m PDUs are extracted and padding bits are removed. Then, the MAC-d PDUs or MAC-c/sh/m PDUs are delivered to the MAC-d entity or MAC-c/sh/m entity, respectively. The disassembly unit 608 performs function F5d for MAC-d PDUs and the disassembly unit 610 performs function F5c for MAC-c/sh/m PDUs. The disassembly unit 608 de-multiplexes MAC-hs PDUs based on MAC-hs header, (e.g., C/T field or other fields indicating the logical channel). The disassembly unit 610 de-multiplexes MAC-hs PDUs based on the MAC-hs header, (e.g., TCTF or other field indicating the logical channel).

Figure 7:
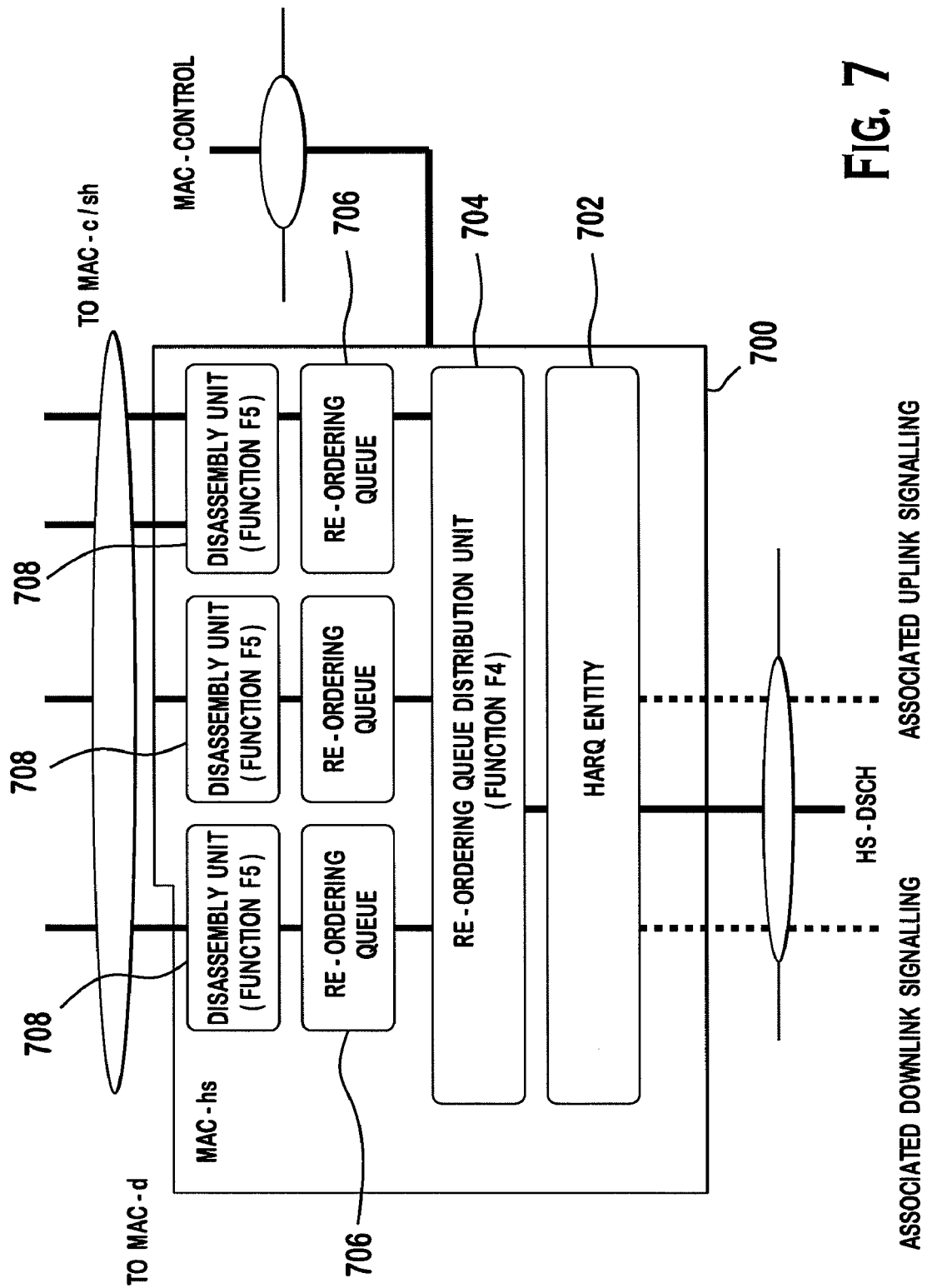
FIG. 7 shows a MAC-hs entity in the WTRU in accordance with another embodiment.

FIG. 7 shows an alternative MAC-hs entity 700 in the UE. The MAC-hs entity 700 includes an HARQ entity 702, a reordering queue distribution unit 704, a plurality of reordering queues 706, and a plurality of disassembly units 708. When different queues and/or logical channels are multiplexed in one MAC-hs PDU, the reordering queue distribution unit 704, (more specifically Function 4 in unit 704), may perform de-multiplexing or de-assembly of the MAC-hs PDU into the respective logical channels or queues. The de-assembly/de-multiplexing shall be done prior to reordering. The reordering queue distribution unit 704 performs distributes the received de-assembled MAC-hs PDUs to the correct reordering buffer. The distribution of MAC-hs PDUs may be based on the logical channel ID and/or based on the detected H-RNTI. The disassembly unit 708 performs function F5 to de-multiplex MAC-hs PDUs based on the MAC-hs header, (e.g., a field indicating logical channel identifier).

If MAC-hs segmentation/concatenation based on available physical resources is performed in the Node B, the disassembly unit 608, 610, 708 may perform re-assembly of the segmented packets and disassembly of the concatenated packets. The received MAC-hs PDU is disassembled into the group of reordering SDUs that belong to the same reordering queue. The group of reordering SDUs is distributed to reordering queues for reordering. Concatenated group of reordering SDUs are disassembled into complete MAC-hs SDUs or MAC-hs SDU segments after reordering is performed. The MAC-hs SDU segments are reassembled into complete MAC-hs SDUs. The complete MAC-hs SDUs are demultiplexed based on logical channel identifiers in MAC-hs headers. The segmentation and concatenation information should be identified in the MAC header.

Figure 8:
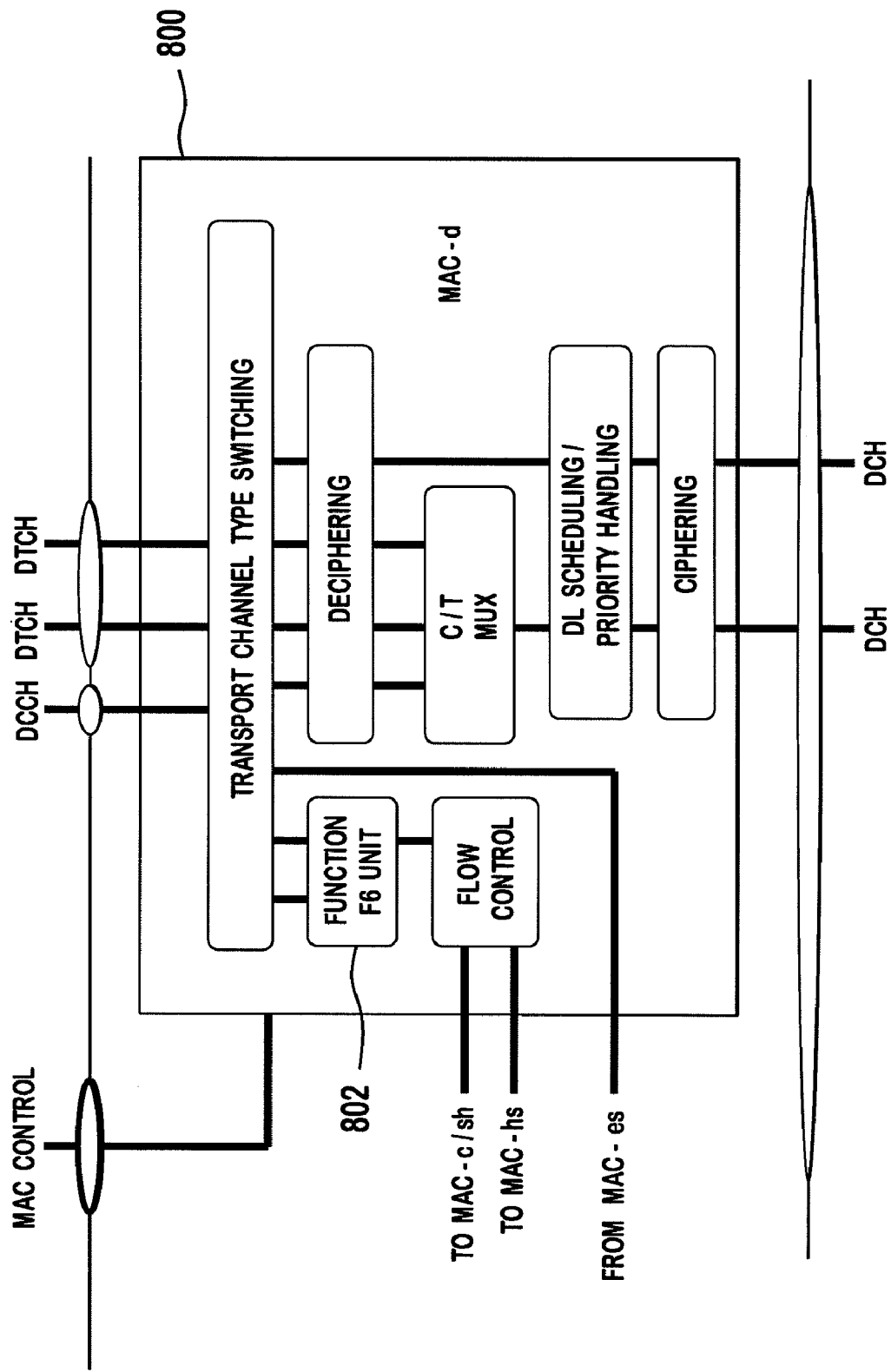
FIG. 8 shows a MAC-d entity in the network.

FIG. 8 shows a MAC-d entity 800 in the network. The MAC-d entity 800 includes an F6 function unit 802. The F6 function unit 802 inserts C/T Mux field in the MAC-d header to indicate the logical channel identity.

Figure 9:
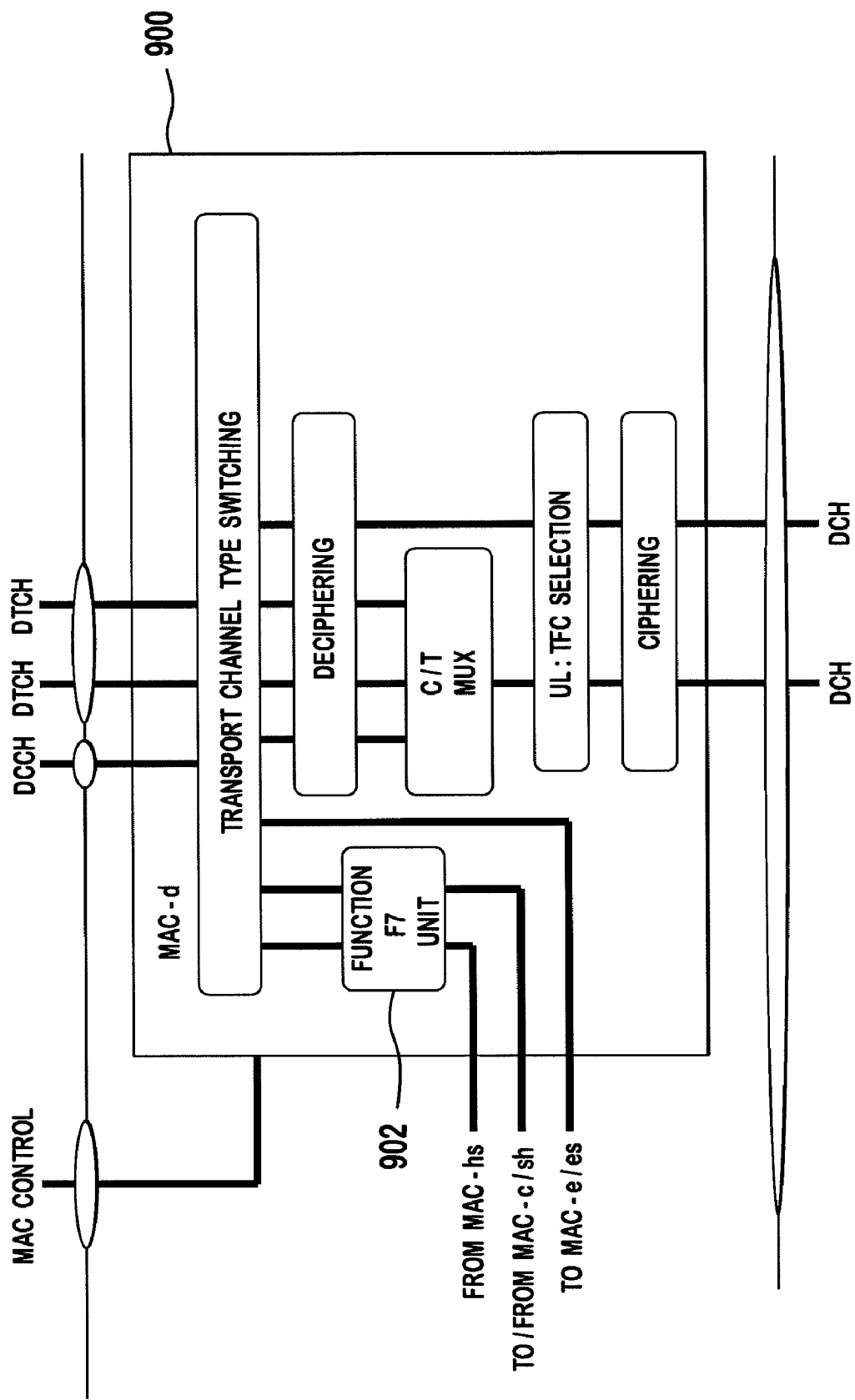
FIG. 9 shows a MAC-d entity in the WTRU.

FIG. 9 shows a MAC-d entity 900 in the UE. The MAC-d entity 900 includes an F7 function unit 902. The F7 function unit 902 extracts the C/T Mux field.

UE identification for HS-DSCH transmission is explained hereinafter. UE identification should be provided for the HS-DSCH transmission to allow a UE to determine if the UE should read (or attempt to read) the HS-DSCH transmission and pass it to the layer above the MAC entity.

In accordance with a first embodiment, the TFRC selection unit 506 in the MAC-hs entity 500 in the network uses a UE-specific H-RNTI for dedicated logical channels, (i.e., DTCH and DCCH), mapped to the HS-DSCH, and a cell-specific H-RNTI for common logical channels mapped to the HS-DSCH. The UE-specific H-RNTI is provided to the UE by higher layers along with (or in place of) a cell radio network temporary identity (C-RNTI). The cell-specific H-RNTI is provided to UEs camped on or connected to the cell. In accordance with the first embodiment, the F1 function unit 302 in the MAC-c/sh/m entity 300 in the network is not required to add "UE ID" and "UE ID Type" fields to the MAC header of every incoming MAC-d PDU that is mapped to common transport channel. The MAC-c/sh/m entity 400 in the UE is not required to read "UE ID" field in the MAC-d PDU header.

For a PCCH, the network may derive a UE-specific H-RNTI from a UE identity, (such as international mobile equipment identity (IMEI) or international mobile subscriber identity (IMSI)). The network may also derive a UE-specific H-RNTI from a UE identity plus a cell-specific identity or the cell-specific H-RNTI. Alternatively, a unique H-RNTI may be used and the IMEI/IMSI based ID is signaled on the HS-DSCH. This may be used when the UE is in the Cell_PCH or URA_PCH states.

In accordance with a second embodiment, a cell-specific H-RNTI is used for dedicated logical channels mapped to the HS-DSCH when the UE is in the Cell_FACH state. In the Cell_PCH or URA_PCH states, either the cell-specific H-RNTI or a unique H-RNTI is used and the IMEI/IMSI based ID is signaled on the HS-DSCH. The UE is identified with the C-RNTI or U-RNTI as in prior art (in the "UE-ID Type" and "UE-ID" fields) if the UE has a mapped FACH. When a UE is configured for reception of HS-DSCH, the UE no longer receives a FACH.

The TFRC selection unit 503 in the MAC-hs entity 500 in the network inserts the "UE-ID Type" and "UE-ID" fields into the MAC-hs header. The "UE-ID type" and "UE-ID" fields are no longer inserted in the header for every MAC SDU in the MAC-c/sh/m entity. The MAC-c/sh/m header is not applied. A new version of the MAC-hs PDU header is defined to include the "UE-ID type" and "UE-ID" fields.

Alternatively, a high speed shared control channel (HS-SCCH) transmission may incorporate the "UE-ID type" and "UE-ID" fields. This new information is applied to the cyclic redundancy check (CRC) overlay in a unique way so that existing H-RNTI coding can be maintained.

In case that multiplexing of logical channels from different UEs is allowed in a MAC-hs PDU, multiple "UE-ID Type" and "UE-ID" fields may be included in the MAC-hs header along with a size index identifier (SID), number of MAC-d PDUS (N), and flag (F) fields to identify the UE that the data belongs to. Alternatively the information may be included in the HS-SCCH transmission.

In addition, a distinct transmission sequence number (TSN) may be included for each UE. This allows the UE to disregard information not destined to the UE when reordering. Specifically, the UE first de-multiplexes the MAC-hs PDU and keeps only the information destined to the UE, and then performs reordering using the TSN associated with this piece of the MAC-hs PDU.

Identification of logical channels is explained hereinafter. Since common logical channels may be transmitted over the HS-DSCH, the network should identify which logical channel a MAC SDU received from the network belongs to.

In accordance with the first embodiment, the logical channel type, or the logical channel type and identity, is indicated in the MAC-hs PDU when the UE is in the Cell_FACH state. The TFRC selection unit 503 in the MAC-hs entity inserts logical channel identification in the MAC-hs header. A new version for the MAC-hs PDU is defined and indicated by a new value of the version field (VF) that includes additional fields for identifying type and identity of logical channels. For instance, the "TCTF" and "C/T Mux" fields may be utilized to indicate the logical channel type and identity.

The TCTF field indicates the logical channel type, (i.e., whether it carries BCCH, CCCH, CTCH, SHCCH, MCCH, MTCH, MSCH or dedicated logical channel information). The C/T Mux field indicates the logical channel instance when multiple logical channels are carried on the same transport channel or on the same MAC-d flow. The "C/T Mux" field is required only if the "TCTF" field indicates that the logical channel is dedicated logical channel, (i.e., DTCH and/or DCCH), and if there are multiple dedicated logical channels mapped to the HS-DSCH.

Figure 10:
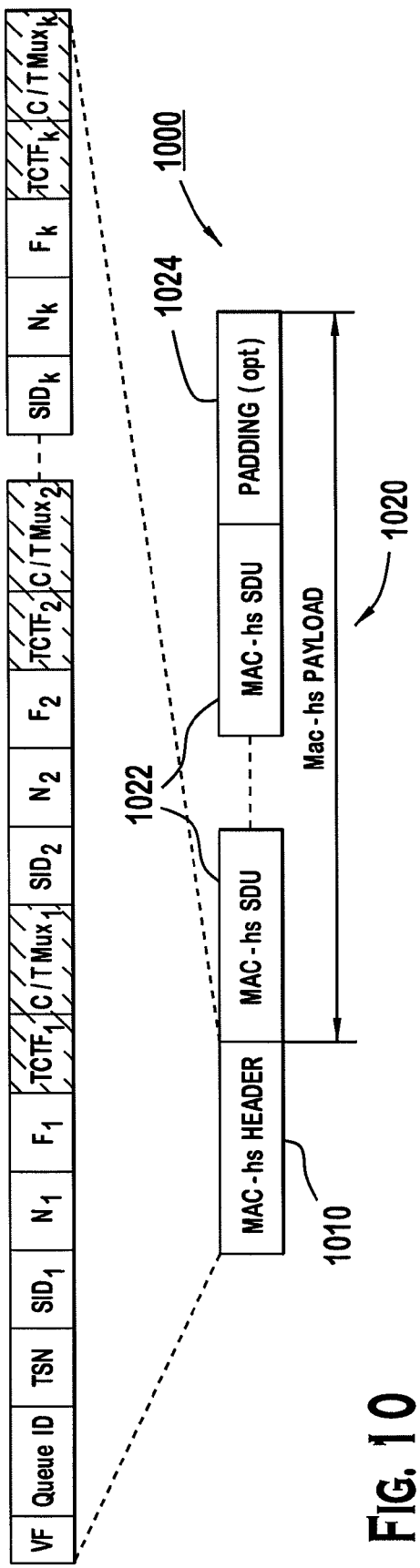
FIG. 10 shows an example MAC-hs PDU format in case that multiplexing is allowed.

The format of the MAC-hs PDU header depends on whether multiplexing of logical channels is allowed in a MAC-hs PDU. FIG. 10 shows an example MAC-hs PDU format in case that multiplexing is allowed. The MAC-hs PDU 1000 includes a MAC-hs header 1010 and a MAC-hs payload 1020. The MAC-hs payload 1020 includes one or more MAC-hs SDUs 1022 and optionally padding 1024. The MAC-hs header 1010 includes a VF, Queue ID, TSN, $SID_n$, $N_n$, $F_n$, $TCTF_n$, and $C/T Mux_n$ fields. The VF field is a one bit flag providing extension capabilities of the MAC-hs PDU format. The Queue ID field provides identification of the reordering queue in order to support independent buffer handling of data belonging to different reordering queues. The TSN field is used for reordering purposes to support in-sequence delivery to higher layers. The $SID_n$ field identifies the size of a set of consecutive MAC-d PDUs. The $N_n$ field identifies the number of consecutive MAC-d PDUs with equal size. The $F_n$ field indicates if more fields are present in the MAC-hs header or not.

Figure 11:
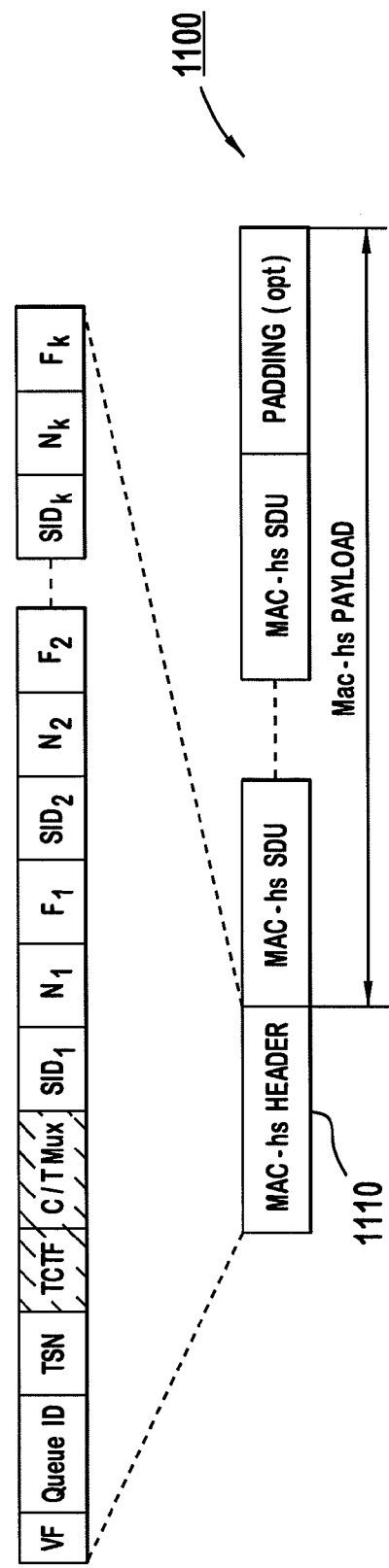
FIG. 11 shows an example MAC-hs PDU format in case that multiplexing is not allowed.

FIG. 11 shows an example MAC-hs PDU 1100 in case that multiplexing is not allowed. The MAC-hs PDU 1100 is similar to the MAC-hs PDU 1000 except in the MAC-hs PDU header 1110, only one TCTF and one C/T Mux field are included. It should be noted that the MAC-hs PDU formats shown in FIGS. 10 and 11 are examples and may be different depending on the specific way queue multiplexing, reordering and/or segmentation (if applicable) are implemented.

Logical channel type may be implicitly indicated to be a PCCH when the UE is in the Cell_PCH or URA_PCH states. Alternatively, an additional value of the TCTF field may be defined for the PCCH.

The MAC-hs PDU header may include a single TSN and Queue ID for the whole MAC-hs PDU as shown in FIGS. 10 and 11. Alternatively, the MAC-hs PDU header may include multiple TSNs and multiple Queue IDs if multiplexing of different queues is allowed. In this case, reordering is performed after demultiplexing of queues. Alternatively, no TSN may be signaled in the MAC-hs PDU header and reordering may be performed above the MAC-hs entity.

In accordance with a second embodiment, the logical channel type and identity are identified by distinct H-RNTI assigned to the UE. The TFRC selection unit 506 selects an H-RNTI for MAC-hs PDU, and the reordering queue distribution unit 604 distributes the received MAC-hs PDUs to a proper reordering queue 606 based on the detected H-RNTI. The mapping between the H-RNTI and the logical channel type is signaled to the UE through an RRC signaling.

In accordance with a third embodiment, the logical channel type is partly identified by H-RNTI and partly by "TCTF" and/or "C/T Mux" fields in the MAC-hs PDU header and/or the HS-SCCH transmission. For instance, the UE may be assigned an H-RNTI for dedicated logical channel traffic and another H-RNTI for common logical channel traffic. The TFRC selection unit 506 selects a proper H-RNTI for the common logical channel traffic and the dedicated logical channel traffic. For the dedicated logical channel traffic, the TFRC selection unit 506 in the MAC-hs entity inserts a C/T Mux" field into the MAC-hs PDU header to identify the logical channel identity while for the common logical channel traffic, the TFRC selection unit 506 inserts a "TCTF" field into the MAC-hs PDU header to identify the common logical channel type. In the UE, the reordering queue distribution unit 604, 704 detects the H-RNTI and distributes the MAC-hs PDU to a proper reordering queue 606, 706 based on the detected H-RNTI, and the disassembly units 608, 610, 708 extract "TCTF" or "C/T Mux" fields and transfer MAC SDU or MAC-d PDU to a higher layer based on the "TCTF" or "C/T Mux" field.

In accordance with a fourth embodiment, the logical channel type is identified in the MAC-c/sh/m PDU as in prior art, (i.e., "TCTF" field is included in the MAC header of every single MAC SDU by the F1 function unit). The "TCTF" field is included in the MAC-d PDUs that are mapped to the common transport channel. The logical channel identity for the dedicated logical channel is indicated in the MAC-d PDU as in prior art, (i.e., "C/T Mux" field is included in the MAC-d PDU header by the F6 function unit 802 when multiple dedicated logical channels are mapped to the HS-DSCH). In the UE, the F2 function unit 402 extracts the "TCTF" field and maps the MAC-hs PDU to a proper logical channel or to the MAC-d entity. The F7 function unit 902 then extracts the "C/T Mux" field to identify the logical channel identity.

In accordance with a fifth embodiment, the logical channel type and/or identity is partially or completely identified by the "Queue ID" field of the MAC-hs PDU header. A mapping is defined between a priority queue and a logical channel type or a group of logical channel types. In the latter case, the F1 function unit 302 adds a "TCTF" field to the header of each MAC SDU from one of the grouped logical channel types. In the UE, the reordering queue distribution unit 604 distributes the MAC-hs PDU based on the Queue ID.

Logical channel identity for dedicated logical channel is optionally identified by a "C/T Mux" field in either the MAC-hs PDU header or the MAC-d PDU header if only the logical channel type is identified by the Queue ID.

Multiplexing of different queues in one MAC-hs PDU may be performed. As described above, a MAC-hs PDU may contain a single pair of Queue ID and TSN values, multiple pairs of Queue ID and TSN values, or no TSN anywhere (neither MAC-d PDU header nor MAC-hs PDU header).

Tables 1 and 2 are summary of the functions performed by the function units in the sub-MAC entities in accordance with different embodiments of the UE identification and the logical channel identification.

Although the features and elements are described in embodiments in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The UE may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:
   receiving a high speed downlink shared channel (HS-DSCH) transmission on a condition that the WTRU is in a CELL_FACH state, a CELL_PCH state, or a URA_PCH state; and
   determining whether to process the HS-DSCH transmission based on an HS-DSCH radio network temporary identity (H-RNTI) associated with the WTRU.

2. The method of claim 1, wherein the determining whether to process the HS-DSCH transmission is performed on a condition that the H-RNTI is assigned to the WTRU and on a condition that the HS-DSCH transmission includes a dedicated logical channel transmission.

3. The method of claim 1, wherein the determining whether to process the HS-DSCH transmission includes using a universal terrestrial radio access network RNTI (U-RNTI) associated with the WTRU, on a condition that the HS-DSCH transmission includes a dedicated logical channel transmission.

4. The method of claim 1, wherein the determining whether to process the HS-DSCH transmission includes using a universal terrestrial radio access network RNTI (U-RNTI) associated with the WTRU, on a condition that the HS-DSCH transmission includes a common logical channel transmission.

5. The method of claim 4, wherein the receiving the HS-DSCH transmission includes receiving a high speed shared control channel (HS-SCCH) transmission and the determining whether to process the HS-DSCH transmission includes applying the H-RNTI to a CRC associated with the received HS-SCCH transmission.

6. The method of claim 1, wherein the receiving the HS-DSCH transmission includes obtaining a first medium access control (MAC) packet data unit (PDU) from the HS-DSCH transmission.

7. The method of claim 6, further comprising:
obtaining, at a first MAC entity, a second MAC PDU from the first MAC PDU, wherein the first MAC entity is associated with the HS-DSCH;
sending the second MAC PDU to a second MAC entity, wherein the second MAC entity is associated with a common logical channel, on a condition that the second MAC PDU is associated with a common logical channel transmission; and
sending the second MAC PDU to a third MAC entity, wherein the third MAC entity is associated with a dedicated logical channel, on a condition that the second MAC PDU is associated with a dedicated logical channel transmission.

8. A wireless transmit/receive unit (WTRU) comprising:
an antenna configured to receive a high speed downlink shared channel (HS-DSCH) transmission on a condition that the WTRU is in a CELL_FACH state, a CELL_PCH state, or a URA_PCH state; and
circuitry including:
a first medium access control (MAC) entity associated with a dedicated logical channel,
a second MAC entity associated with a common logical channel, and
a third MAC entity configured to process the HS-DSCH, wherein the circuitry is configured to use an HS-DSCH radio network temporary identity (H-RNTI) to determine whether to process the HS-DSCH transmission.

9. The WTRU of claim 8, wherein the circuitry is configured to determine whether to process the HS-DSCH transmission on a condition that the H-RNTI is assigned to the WTRU and on a condition that the HS-DSCH transmission includes a dedicated logical channel transmission.

10. The WTRU of claim 8, wherein the circuitry is configured to determine whether to process the HS-DSCH transmission using a universal terrestrial radio access network RNTI (U-RNTI) associated with the WTRU, on a condition that the HS-DSCH transmission includes a dedicated logical channel transmission.

11. The WTRU of claim 8, wherein the circuitry is configured to determine whether to process the HS-DSCH transmission using a universal terrestrial radio access network RNTI (U-RNTI) associated with the WTRU, on a condition that the HS-DSCH transmission includes a common logical channel transmission.

12. The WTRU of claim 11, wherein the antenna is configured to receive a high speed shared control channel (HS-SCCH) transmission and the circuitry is configured to determine whether to process the HS-DSCH transmission by applying the H-RNTI to a CRC associated with the received HS-SCCH transmission.

13. The WTRU of claim 8, wherein the circuitry is configured to obtain a first medium access control (MAC) packet data unit (PDU) from the HS-DSCH transmission.

14. The WTRU of claim 13, wherein the third MAC entity is configured to:
obtain a second MAC PDU from the first MAC PDU;
send the second MAC PDU to the second MAC entity, on a condition that the second MAC PDU is associated with a common logical channel transmission; and
send the second MAC PDU to the first MAC entity, on a condition that the second MAC PDU is associated with a dedicated logical channel transmission.

* * * * *